May 25, 1937. W. W. SHAVER 2,081,508
INSULATOR HAVING HIGH SURFACE RESISTANCE AND METHOD OF MAKING IT

Filed May 2, 1934

INVENTOR.
William W. Shaver
BY Dorsey & Ole
ATTORNEYS.

Patented May 25, 1937

2,081,508

UNITED STATES PATENT OFFICE 2,081,508

INSULATOR HAVING HIGH SURFACE RESISTANCE AND METHOD OF MAKING IT

William W. Shaver, Corning, N. Y., assignor to Corning Glass Works, Corning, N. Y., a corporation of New York Application May 2, 1934, Serial No. 723,613

6 Claims. (Cl. 173—28)

This invention relates to electrical insulators of glass and has for its object to increase their electrical surface resistance, hereinafter called surface resistance.

It is well known that insulators composed of low expansion borosilicate glass have a higher surface resistance than insulators made of lime glass. Furthermore, it is known that insulators of lime glass are cheaper to manufacture than those of low expansion borosilicate glass. By means of the invention to be hereinafter more fully described, I am able to greatly increase the surface resistance of a lime glass insulator. I also am able to increase to some extent the already high surface resistance of a low expansion borosilicate glass insulator. Insulators treated in accordance with my invention have a distinctive coloration ranging from a canary yellow through brown to a deep red, and hence may be used as the so called "Marker type" insulator for distinctively marking out special circuits.

In general, my invention comprises treating the surface of a glass insulator with a copper or silver compound at elevated temperatures to cause an exchange of the copper or silver atoms with the alkali atoms of the glass and permanently to incorporate the copper or silver atoms in the surface of the glass, thereby producing a colored integral layer, a process which is hereinafter called "staining".

My invention further comprises a glass insulator having a part or all of its surface stained.

Figure 1:
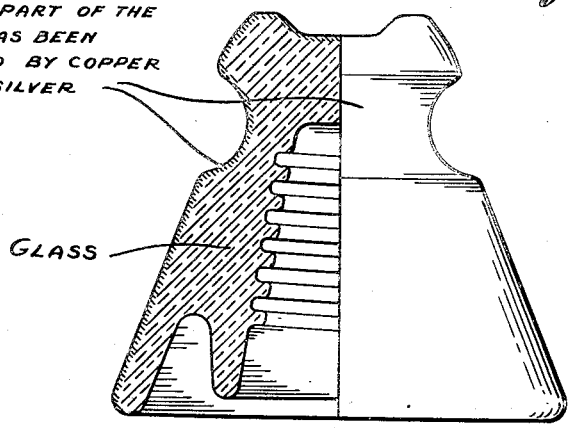
Figure 2:
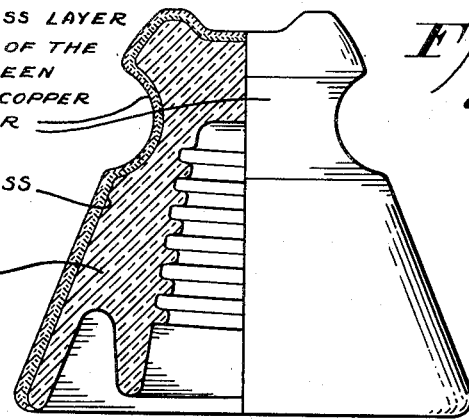

To permit a better understanding of my invention reference is had to the accompanying drawing in which:

Fig. 1 is an elevation, partly in section, of a glass insulator stained in accordance with my invention, and Fig. 2 is an elevation, partly in section, of a porcelain insulator stained in accordance with my invention.

In applying stains to glass insulators, I may use either the paste method or the dipping method.

The paste method comprises painting or spraying on the surface of the insulator which is to be stained a paste or slip containing copper sulphide and yellow ochre finely ground with water, firing the insulator for about forty-five minutes to a temperature of 600° to 700° C., annealing and cooling the insulator and wiping off the residual staining compound. In preparing the staining paste, various proportions may be used, but I prefer a mixture comprising about 340 grams of copper sulphide and 540 grams of yellow ochre. In lieu of copper sulphide, I may use silver sulphide, or I may use a mixture of both. When the staining compound contains copper sulphide alone, the resulting color of the stained insulator is a canary yellow. When silver sulphide is used, either alone or in combination with copper sulphide, a deep amber color is produced. A red coloration may be produced by staining first with copper sulphide alone to produce a yellow color, after which the insulator is heated under reducing conditions, such as by passing the insulator through a lehr in a closed receptacle containing a reducing agent, such as glycerine, urea, paraformaldehyde, or the like. Annealing may be accomplished during the reduction, if desired.

It is important that the insulator be annealed after staining, since stained insulators which are severely strained do not show as high a surface resistance as stained insulators which have been well annealed.

The dipping method comprises immersing the insulator for one to two minutes in a molten bath containing a copper or a silver salt, or both, removing and cooling the insulator, washing off the residual staining salt with strong hydrochloric acid and annealing the insulator. In this case, also, annealing is important for the reason mentioned above. If the insulator is of lime glass, the temperature of the bath should preferably not exceed 625° C. and the insulator must be preheated before immersion. If the insulator is of low expansion, borosilicate glass, the temperature may be as high as 650° C. to 750° C., and the insulator, if very thick, is preferably preheated. In preparing the staining bath, it is preferable to use cuprous chloride, because it is relatively inexpensive and melts at about 422° C., but other copper salts of sufficiently low melting point may be used, such as cupric chloride. Of the silver salts, silver chloride is to be preferred, although other silver salts of sufficiently low melting point may be used. On account of the expense of silver salts, it is preferable to use a mixture of copper and silver salts, if it is desired to produce the amber coloration which is characteristic of silver. A bath comprising 80 parts of cuprous chloride and 20 parts of silver chloride will produce a good amber. Non-borosilicates, such as lime glasses, do not stain as readily as borosilicates but can be stained satisfactorily if the bath contains a sulphide. Therefore, in case the insulator is of lime glass, there should be added to the molten bath at least 5% of a sulphide such as copper sulphide, which is readily soluble therein.

As in the paste method, the dipping method will produce a yellow coloration if the bath contains only a copper salt and will produce an amber coloration if the bath contains either a silver salt alone or a mixture of copper and silver salts.

In order to produce a red coloration, the insulator is treated in a molten bath of copper salt to produce the yellow coloration and then, after the residual salt is washed off with hydrochloric acid, the insulator is heated in a reducing atmosphere, as by passing through a lehr in a covered receptacle containing a reducing agent, which is preferably paraformaldehyde. Annealing may be accomplished during the reduction by heating to the necessary temperature and cooling at the proper rate. In case the insulator is of low expansion borosilicate glass, the reduction produces directly a ruby color. If the insulator is of soda lime glass, the reduction causes a black coloration and this becomes ruby if reheated again under oxidizing conditions, as by simply passing through a lehr. Various shades of red may be produced by varying the amount of reduction. A maximum red coloration is produced, for example, by using 20 grams of paraformaldehyde in a container of about 2 cu. ft. capacity. Lighter shades may be produced by using less time or temperature of immersion and also by using smaller amounts of a reducing agent, or by using a weaker reducing agent, such as urea. The conditions for a desired shade are readily ascertained by experiment.

I have found that at 41° C. and approximately 100% relative humidity, lime glass insulators treated in accordance with my invention have their surface resistance increased more than a thousand-fold, and insulators of low expansion boro-silicate glass have their surface resistance increased several hundred-fold. Insulators made in accordance with my invention are colored in a very thin layer of their surface and this colored layer, according to analysis, has a lower alkali content than the uncolored portion of the glass and also contains copper and/or silver derived from the staining salt. It is thought that copper or silver atoms replace the alkali from the glass.

The surface resistance of my improved insulator is to a small extent dependent upon the color, and the insulator will have a slightly higher surface resistance if the red color is developed. However, the relatively wide range of colors which are obtainable in the process and the permanency thereof to weathering or abrasion makes my insulator particularly suitable as a "Marker type" insulator.

Experience has shown that the surface resistance of an ordinary insulator decreases as the relative humidity increases, but I have found that the surface resistance of my improved insulator does not decrease as much as that of an ordinary insulator. In other words, the ratio of the resistance of a copper stained glass insulator to that of an ordinary untreated glass insulator of the same type varies with the relative humidity and increases as the humidity increases. For example, comparative measurements of two such borosilicate insulators showed the above mentioned ratio to be 40 to 1 at a relative humidity of 65%, 141 to 1 at 85% relative humidity, and 398 to 1 at 96% relative humidity.

My invention may also be carried out with porcelain insulators, provided that the porcelain is glazed with an alkali-containing glass of an expansion coefficient near enough to that of the porcelain to prevent crazing when heated during the staining process.

The word "stained", as used herein, refers to glass which is impregnated and colored by treatment with, and penetration of, copper or silver compounds at elevated temperatures, as distinguished from enamelled, glazed, and iridized glass.

What I claim is:

1. An insulator having a glass surface, an area of which is stained with a metal of the group consisting of copper and silver, said stained area having a higher electrical resistance than the unstained area.

2. A glass insulator, the surface of which is stained with copper, the stained surface having a higher electrical resistance than the unstained interior body of the glass.

3. A glass insulator, the surface of which is stained with silver, the stained surface having a higher electrical resistance than the unstained interior of the glass.

4. A glass insulator, the surface of which is stained with copper and silver, the stained surface having a higher electrical resistance than the unstained interior of the glass.

5. A glass insulator, the surface glass of which is stained with copper in a very thin layer, the stained layer having a lower alkali content and a higher electrical resistance than the unstained interior portion of the insulator.

6. A porcelain insulator glazed with an alkali-containing glass, the surface of which is stained with copper in a very thin layer, the stained layer having a lower alkali content and a higher electrical resistance than the unstained interior portion of the glass.

WILLIAM W. SHAVER.